United States Patent
Kivelä et al.

(10) Patent No.: US 10,499,663 B2
(45) Date of Patent: Dec. 10, 2019

(54) METHOD OF MANUFACTURING A MEAT REPLACEMENT PRODUCT AND A MEAT REPLACEMENT FOOD PRODUCT

(71) Applicant: GoldGreen Foods OY, Helsinki (FI)

(72) Inventors: Reetta Kivelä, Helsinki (FI); Anna Häkämies, Helsinki (FI)

(73) Assignee: GOLD & GREEN FOODS OY, Helsinki (FI)

( * ) Notice: Subject to any disclaimer, the term of this patent is extended or adjusted under 35 U.S.C. 154(b) by 0 days.

(21) Appl. No.: 15/229,290

(22) Filed: Aug. 5, 2016

(65) Prior Publication Data
US 2017/0105428 A1 Apr. 20, 2017

(30) Foreign Application Priority Data
Oct. 16, 2015 (EP) .................................... 15190251

(51) Int. Cl.
| A23J 3/26 | (2006.01) |
| A23J 3/14 | (2006.01) |
| A23P 30/20 | (2016.01) |
| A23L 7/10 | (2016.01) |
| A23L 7/117 | (2016.01) |
| A23L 7/17 | (2016.01) |
| A23L 33/185 | (2016.01) |
| A23L 33/21 | (2016.01) |

(52) U.S. Cl.
CPC . *A23J 3/26* (2013.01); *A23J 3/14* (2013.01); *A23L 7/115* (2016.08); *A23L 7/117* (2016.08); *A23L 7/17* (2016.08); *A23L 33/185* (2016.08); *A23L 33/21* (2016.08); *A23P 30/20* (2016.08)

(58) Field of Classification Search
CPC ........................................ A23J 3/26; A23J 3/14
USPC ............................................................ 426/610
See application file for complete search history.

(56) References Cited

U.S. PATENT DOCUMENTS

| 3,054,677 | A | 9/1962 | Graham, Jr. et al. |
| 3,345,183 | A | 10/1967 | Lilly et al. |
| 3,541,946 | A | 11/1970 | Johnston et al. |
| 4,178,394 | A | 12/1979 | Kumar |
| 4,228,195 | A | 10/1980 | Henson et al. |
| 4,497,840 | A | 2/1985 | Gould et al. |
| 5,858,442 | A | 1/1999 | Payne et al. |
| 5,922,392 | A | 7/1999 | Kelly et al. |
| 6,355,294 | B1 | 3/2002 | Dupart et al. |
| 8,277,866 | B2 | 10/2012 | Plattner et al. |
| 8,322,272 | B1 | 12/2012 | Wenger |
| 8,366,433 | B2 | 2/2013 | Chatel et al. |
| 8,551,544 | B2 | 10/2013 | Borders et al. |
| 8,574,644 | B2 | 11/2013 | Chatel et al. |
| 8,802,177 | B2 | 8/2014 | Chatel et al. |
| 9,034,402 | B2 | 5/2015 | Wong et al. |
| 2002/0039612 | A1 | 4/2002 | Gambino et al. |
| 2004/0037905 | A1 | 2/2004 | Bringe |
| 2005/0064079 | A1 | 3/2005 | Allen et al. |
| 2007/0087107 | A1 | 4/2007 | Borders et al. |
| 2007/0128251 | A1 | 6/2007 | Paulsen et al. |
| 2007/0141218 | A1 | 6/2007 | Chatel et al. |
| 2007/0207244 | A1 | 9/2007 | Grant |
| 2007/0237872 | A1 | 10/2007 | Chatel et al. |
| 2007/0259090 | A1 | 11/2007 | Taylor et al. |
| 2008/0233244 | A1 | 9/2008 | Swenson |
| 2008/0260913 | A1 | 10/2008 | Orcutt et al. |
| 2008/0305212 | A1* | 12/2008 | Wong ................... A23C 9/1526 426/72 |
| 2009/0155444 | A1 | 6/2009 | Yakubu et al. |
| 2009/0208633 | A1 | 8/2009 | Kyed et al. |
| 2010/0112176 | A1 | 5/2010 | Chatel et al. |
| 2011/0086151 | A1 | 4/2011 | Plattner et al. |
| 2012/0052151 | A1 | 3/2012 | Sannino et al. |
| 2012/0093994 | A1 | 4/2012 | Hsien et al. |
| 2013/0036149 | A1 | 2/2013 | Kosuru et al. |
| 2015/0037484 | A1 | 5/2015 | Cvetkovich et al. |

FOREIGN PATENT DOCUMENTS

| AU | 643618 | 8/1992 |
| AU | 643618 | 11/1993 |
| AU | 774251 | 7/2000 |
| AU | 2014253518 | 11/2014 |
| AU | 201421268 | 1/2015 |
| CA | 2229346 | 5/2002 |
| CN | 1036223 | 10/1989 |
| CN | 1119086 | 8/2003 |
| CN | 1864535 | 11/2006 |

(Continued)

OTHER PUBLICATIONS

Written Opinion of PCT Application PCT/EP2016/074556 dated Apr. 20, 2017, EPO.
First Examination Report dated Jul. 12, 2018.
Examination Report No. 1 Application 2016336811 dated Aug. 21, 2018.
Nov. 9, 2018 Applicant's response to Examination Report #1 from Australian Patent Office re: AU application 2016336811.
Nov. 20, 2018 Examination Report No. 2 from Australian Patent Office re: AU application 2016336811.
Dec. 21, 2018 Search Report and Written Opinion from Singapore Patent Office (English translation).
Inquiry under the substantive examination from Russian Patent Office (original and English translation).

(Continued)

*Primary Examiner* — Hamid R Badr

(57) ABSTRACT

A method of manufacturing a textured food product and a texturized food product comprises the steps of preparing a slurry, the dry matter of which comprises at least 35 weight-% legume protein, 10 to 45 weight-% oat bran, wholegrain oat flour or a mixture thereof, and 3.5 to 35% weight-% oat protein, wherein the oat bran, wholegrain oat flour and oat protein add up to no more than 65 weight-%. The slurry further comprises water 20-80%, preferably 30-40%, most preferably 35-40%, of the weight of the dry matter. The method further includes cooking the slurry in an extruder cooker and extruding it to form a texturized food product.

26 Claims, 6 Drawing Sheets

(56) References Cited

FOREIGN PATENT DOCUMENTS

| | | | |
|---|---|---|---|
| CN | 101185495 | 5/2008 | |
| CN | 201156945 | 12/2008 | |
| CN | 101642207 | 2/2010 | |
| CN | 101818182 | 9/2010 | |
| CN | 101288446 | 4/2011 | |
| CN | 101558904 | 8/2011 | |
| CN | 101642251 | 2/2012 | |
| CN | 102432693 | 5/2012 | |
| CN | 101695373 | 6/2012 | |
| CN | 101606710 | 7/2012 | |
| CN | 102113700 | 7/2012 | |
| CN | 102132829 | 9/2012 | |
| CN | 102696967 | 10/2012 | |
| CN | 102246922 | 1/2013 | |
| CN | 102894089 | 1/2013 | |
| CN | 102894100 | 1/2013 | |
| CN | 103211152 | 7/2013 | |
| CN | 102356846 | 8/2013 | |
| CN | 103330142 | 10/2013 | |
| CN | 203302253 | 11/2013 | |
| CN | 103461779 | 12/2013 | |
| CN | 103519187 | 1/2014 | |
| CN | 103535708 | 1/2014 | |
| CN | 102845677 | 3/2014 | |
| CN | 103749691 | 4/2014 | |
| CN | 104000104 | 8/2014 | |
| CN | 103110066 | 11/2014 | |
| CN | 104171970 | 12/2014 | |
| CN | 104187388 | 12/2014 | |
| CN | 104336502 | 2/2015 | |
| EA | 7607 | 12/2006 | |
| EP | 326253 | 8/1989 | |
| EP | 434025 | 9/1993 | |
| EP | 818956 | 10/1996 | |
| EP | 758851 | 7/1998 | |
| EP | 0910961 | 4/1999 | |
| EP | 1142485 | 10/2001 | |
| EP | 1415539 * | 5/2004 | ............... A21D 8/04 |
| EP | 1279340 | 5/2006 | |
| EP | 1895859 | 12/2006 | |
| EP | 2020868 | 2/2009 | |
| EP | 2020875 | 2/2009 | |
| EP | 2364601 | 9/2011 | |
| EP | 2725924 | 1/2013 | |
| FI | 114380 | 4/2002 | |
| GB | 905270 | 9/1962 | |
| GB | 1037757 | 8/1966 | |
| GB | 1143373 | 2/1969 | |
| GB | 1154074 | 6/1969 | |
| GB | 1253104 | 11/1971 | |
| GB | 1306666 | 2/1973 | |
| GB | 1433976 | 4/1976 | |
| GB | 1436506 | 5/1976 | |
| GB | 1442059 | 7/1976 | |
| GB | 1454429 | 11/1976 | |
| GB | 1464409 | 2/1977 | |
| GB | 2055545 | 3/1981 | |
| JP | 2005013216 | 1/2005 | |
| MX | 2009003064 | 1/2009 | |
| RU | 2060688 | 5/1996 | |
| RU | 2427281 | 8/2011 | |
| SU | 1540783 | 2/1990 | |
| WO | WO9631128 * | 10/1996 | ............... A23L 1/10 |
| WO | WO 0121012 | 3/2001 | |
| WO | WO 0228201 | 4/2002 | |
| WO | WO 2004086878 | 1/2004 | |
| WO | WO2008036906 * | 3/2008 | ............... A23J 3/22 |
| WO | WO 2008036906 | 3/2008 | |
| WO | WO 2008096044 | 8/2008 | |
| WO | WO 2008124620 | 10/2008 | |
| WO | WO 2009102869 | 8/2009 | |
| WO | WO 2009118282 | 10/2009 | |
| WO | WO 2010053651 | 5/2010 | |
| WO | WO 2010140963 | 12/2010 | |
| WO | WO 2011011456 | 1/2011 | |
| WO | WO 2011053786 | 5/2011 | |
| WO | WO 2013010381 | 1/2013 | |
| WO | WO 2013036149 | 3/2013 | |
| WO | WO2013120856 | 8/2013 | |
| WO | WO 2015020873 | 2/2015 | |
| WO | WO 2015158959 | 10/2015 | |
| WO | WO 2016118479 | 7/2016 | |

OTHER PUBLICATIONS

Mar. 12, 2019 Notice of Rejection.
Mar. 12, 2019 Notice of Rejection, Translation.
Protein Isolate from High-Protein Oats, vol. 42, No. 5, Journal of Food Science, Wu, Sexson, Cluskey and Inglett.
Notice of Grounds for Rejection in Korea, WIPO, Jul. 30, 2019 and English Translation.
Decision to Grant EPO, Jul. 19, 2019 (Russia and English Translation).
Decision to Grant Russia, Jul. 19, 2019 (Russia and English Translation previously submitted—naming error correction only).
Intent to Grant EPO (Feb. 4, 2019) and Declaration to Grant (Jul. 18, 2019) (document being submitted).

* cited by examiner

METHOD OF MANUFACTURING A MEAT REPLACEMENT PRODUCT AND A MEAT REPLACEMENT FOOD PRODUCT

FIELD OF THE INVENTION

The present invention relates to methods for manufacturing of textured food products.

TECHNICAL BACKGROUND

Vegetable-based protein-rich products offer many benefits and advantages to consumers. Protein-rich plant food offers a sustainable way of fulfilling the daily protein requirements. In addition to the proteins, plants are high in bioactive compounds such as complex carbohydrates, which are widely recognized as being healthful. The majority of the Western consumers would like to prefer a plant-based diet due to its healthiness and ecological concern. However, many consumers find it difficult to keep their daily protein intake sufficient due to the narrow and inconvenient offering of proteinous plant products.

Protein bar snack products are a convenient choice, but are limited to syrup-based taste profiles and have sandy structure. The main-course plant protein foods in the markets are often sold as dry, requiring time and certain knowledge to process them to an edible meal. From the viewpoint of ingredients commercially available as ready-to-eat products, vegetarian minded consumers have also only few choices. Most of the ready-to-eat products containing plant protein are based on soya or wheat gluten, which some consumers like to avoid due to allergy, ecological or ethical reasons or GMO related concerns.

One of the challenges with soya products widely utilized as a plant based main course is the beany taste of the products that makes some consumers to search for alternatives.

Objective of the Invention

An objective of the invention is to improve the nutritional value of a textured food product manufactured by cooking and extruding legume protein. This objective can be fulfilled with the method according to claim 1 and with the textured food product according to claim 13.

The dependent claims describe advantageous embodiments of the method.

Advantages of the Invention

The method of manufacturing a textured food product comprises the steps of:
preparing a slurry,
i) the dry matter of which comprises:
1. at least 35 weight-% legume protein,
2. 10 to 45 weight-% oat bran, wholegrain oat flour or a mixture thereof, and
3. 5 to 35% weight-% oat protein,
of which 2. and 3. must always add up to no more than 65 weight-%; and
ii) the slurry further comprising water 20-80%, preferably 30-40%, most preferably 35-40 of the weight of the dry matter; and
cooking the slurry in an extruder cooker and extruding it to form an texturized food product.

Preferably, the share of oat protein is chosen to compensate for the effects leading to a dough-like texturization due to the share of oat bran or wholegrain oat flour or the mixture thereof.

The result of the method results in a textured food product having all amino acids necessary for human daily intake that cannot be synthetized in novo. Furthermore, the resulting textured food product is heat-resistant, boiling resistant and suitable for cooking. Because of the extrusion, it is also ready-to-eat and can be consumed as a snack or as a main course food.

Further advantages of the method are that the porous texture will be avoided, and that the water absorption rate and hydration level of the textured food product will be reduced thanks to the share of oat protein as compared with a textured food product manufactured by cooking and extruding a slurry consisting of legume protein, oat bran, wholegrain oat flour, or a mixture thereof, and water.

These improvements in the structure of the textured food protein improve the acceptability of the textured food product by consumers. Furthermore, the acceptability by consumers will further be improved due to the fact that the oat bran, or wholegrain oat flour, or the mixture thereof tends to eliminate the slightly bitter taste of the legume protein.

Advantageously, the cooking is performed in 130-180° C., preferably in 170-180° C. and most preferably in 175° C. to improve the structure of the textured food product.

Advantageously, the share of oat bran and of oat protein in the slurry makes 40 to 60 weight-% of the dry matter content of the slurry and preferably is chosen to make the texturized food product to have a consistency for which the resistance force of a 9.0 and 10.5 mm high sample during a compression test with a knife blade required to cut the sample is between 16 and 28 N with a penetration distance between 5.5 and 8.5 mm, preferably 7.5-8.5 mm. The force required to cut the texturized food product reflects the mouthfeel (i.e. bite resistance) that is an extremely important acceptability/quality parameter of a texturized food product. The texturized food product of according to the present invention gives very an acceptable mouthfeel, desirable chewiness and juiciness, and a feeling of real food in contrast to sandy or powdery (non-continuous) structures that are assumed in the case of insoluble proteins.

Advantageously, the texturized food product is further processed with water, salt, oil and spices and brewed which can include fermenting the texturized food product in a liquid slurry or, alternatively, or in addition to brewing, otherwise hydrated, wetted or soaked for 2 to 12 hours before additional baking, cooking or high pressure cooking. This processing step increases the moisture in the texturized food product and improves the sensory properties of the texturized food product. Preferably, water, oil and spices are sprayed at the texturized food product and salt is sprinkled.

Advantageously, during the brewing (or, alternatively, during hydration, wetting or soaking), the share of water to the texturized food product is between 1:1.0 to 1:1.5 by weight, as a lower water content does not provide enough moisture and a higher water content would ruin the desirable structure of the texturized food product.

Advantageously, amylase is added to the texturized food product after the extruder cooking step but before the additional high pressure cooking. This enhances sensory properties of the product.

Advantageously, the additional high pressure cooking step is performed in an autoclave or in a pressurized cooking device, preferably having a pressure of at least 1.9 bar (most preferably between 1.9 bar and 2.1 bar), and preferably for between 20 to 60 minutes or preferably around 25 minutes, or for between 30 to 60 minutes, such as for 35 to 45 minutes. High pressure cooking further enhances the sensory properties of the product. High pressure cooking step in an autoclave keeps the moisture of the texturized food product in balance and further binds fibers together. High pressure cooking differs from steam heat and hypercritical steam heat treatments which would ruin desirable structure of the texturized food product.

Alternatively to the high pressure cooking step, the additional baking or cooking step may be performed in an oven or in a steam oven, in a temperature between 110 and 130° C., most preferably around 121° C.

Preferably, the oat protein is introduced into the slurry as oat protein fractions. This form of oat protein has turned out to produce a texturized food product of very good sensory quality with the method according to the invention. The at least 35% of legume protein is, preferably, computed from the protein fraction of the respective legume protein/legume proteins introduced into the slurry.

Preferably, the legume protein introduced into the slurry is selected from at least one of the following: pea protein concentrate, pea protein isolate, *Vicia faba* protein concentrate, *Vicia faba* protein isolate, peanut protein concentrate and peanut protein isolate. These are widely available, have acceptable digestive qualities and are very suitable for many consumers. Advantageously, the extrusion is carried out as protein texturization extrusion. In this case, the water feed rate during the extrusion and other extrusion parameters are preferably selected such that the texturized food product will result in relatively thick (such as between 15 and 20 μm) co-aligned fibers that are bunched together.

LIST OF DRAWINGS

The method is explained gone through in more detail in the following by way of the exemplary embodiments and as shown in the attached drawings in FIGS. 1 to 9.

DETAILED DESCRIPTION

Figure 1:
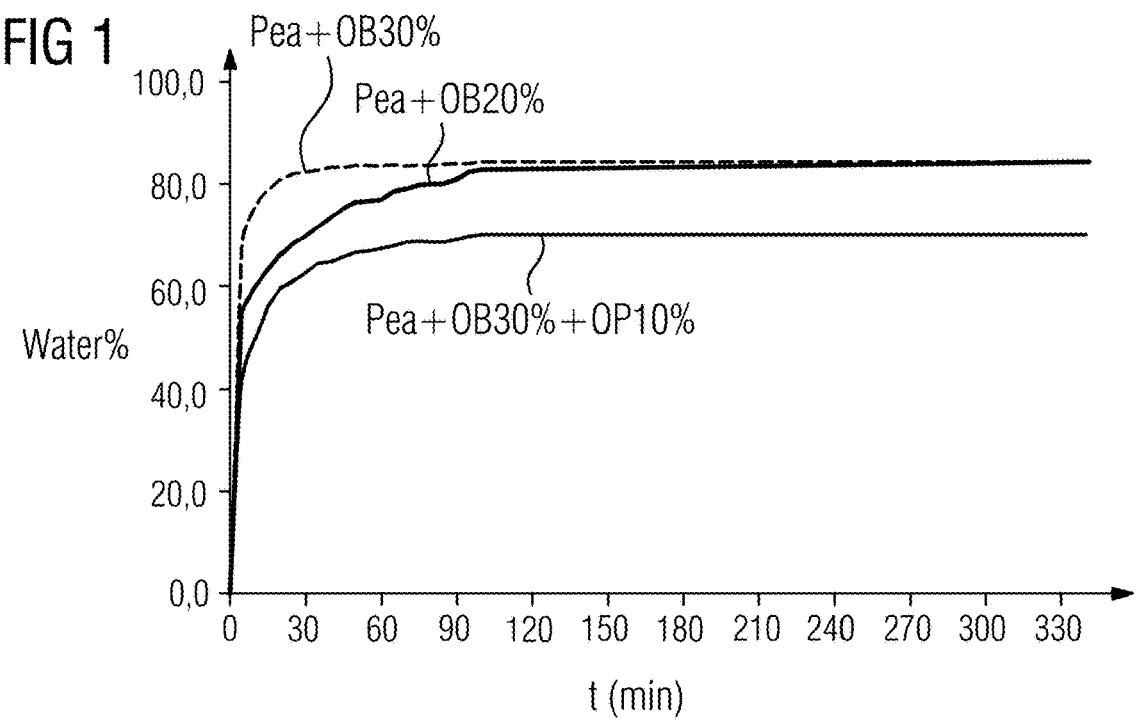
FIG. 1 shows water absorption rates and hydration levels for extruded texturized food products which contain certain legume proteins, 20% or 30% of oat bran and 10% of oat protein.

Oat has a relatively mild taste and is ecologically not much demanding. Indeed, oat is one of the most ecological farmed plants on the earth due to its nitrogen-binding properties. Furthermore, it is, in contrast to other grains, usually well-tolerated, even by those with the celiac disease. The health benefits of oat are well-known and proved. The complex carbohydrate of oats, the special soluble fiber beta-glucan, has been proved to be beneficial to cardiac health and blood sugar balance. Oats are also rich of plant lipids, meaning oils that are understood to be beneficial for human health. In addition, oats contains a relatively high amount of proteins with a good amino acid range. In the method described in the following, the most nutritive parts of oat kernel such as oat bran and protein fractions are used assuring the highly nutritive properties of the end product.

In addition to nutritional properties, oat protein fractions have a relatively mild taste when compared to several other vegetable protein rich flours or powders. One of the biggest problems when using legumes is the beany taste that is by the present inventors considered undesirable.

Fibrous texture products from soy proteins are well known. The process to manufacture the products is called texturization and is based on the use of extrusion technique. Extrusion technique in food processing has been used to prepare certain pastas, breakfast cereals, pre-made cookie dough, French fries and ready-to-eat snacks. Generally, high-temperature extrusion is used to manufacture ready-to-eat snacks, while cold extrusion is used for manufacturing pasta and related products intended for later cooking and consumption.

Extrusion method in pasta processing provides conveying, compacting, kneading, relaxing, and extruding forces. There is only a limited amount of heat generated by friction between the dough and metal surfaces of the barrel and the screw. The temperature is kept between 45° C. and 50° C. by cooling water in order to prevent the protein from denaturation, which can make the pasta soft and sticky. So in this process, the proteins are not denatured and starch is not fully gelatinized.

Starch-based extrusion has higher temperature (150° C.-170° C.) and shear pressure in the later units. Starch is released and solubilized in the chambers (between screw and barrel). Starch carries water with high energy in the chambers. When the material comes out from the die, the pressure is released, water evaporates, foams were formed, the structure expands and starch gelatinizes and stabilizes the structure. Protein can interfere the starch gel expansion. The water feed rate is between 15-20%. In this process, starch is gelatinized, partially degraded, proteins are denaturized, protein-starch interactions and lipid-protein interactions/complexes are possibly formed.

The protein texturization extrusion is different from starch-based extrusion although the extrusion temperature is similar (120° C.-180° C.) with starch-based extrusion. Shearing by extrusion at elevated temperatures is the causing force for forming the fibrous protein networks or texturization [1]. The recipe for protein texturization is different from the starch-based extrusion. The protein content is higher. The water feed rate is higher (limit: 20-80%; preferably 20-45%) than that of the starch-based extrusion. The screw unit design is different, because the flow behavior of the fed material are different. The rheology of the protein-rich material in the barrel and screw is different from that of the starch-based extrusion material. At final stage before the die and during the die a certain design of screw unit is needed for the formation of a fibrous protein-protein network structure formation. During this process, starch is gelatinized, protein is unfolded/denaturized, untangled, aligned, structured/polymerized and stabilized. There is also theory support that protein melts in certain stage of the extrusion screw unit. The protein-protein interaction forces are still not fully understood, but at least involve hydrophobic interaction, disulfide bonding and oxidative crosslinking between amino acids. Since oat proteins are denser, more heat-resistant and hydrophobic as most of the cereal proteins, they are not assumed to form fibrous structures during extrusion like is widely known that the legume proteins do. The flexible legume proteins orientate during shearing under heating, and are thus forced to lose their tertiary structure and covalent bonds. While cooling down the oriented proteins, they find new sites for covalent bonding and form fibrous irreversible structures that have been obtained to have chewable nature widely utilized in meat analogues.

However, when oat materials such as whole grain flour and oat bran, which are ingredients scientifically proven healthy, are textured with the legume proteins in higher amounts (i.e. 20%), they damage the fibrous texture formation and result in dough-like textures in which a chewable fibrous structure is ruined. In addition, the dough-like texture is easily slimy that is a common challenge of oat. One challenge following the oat bran addition is as well the increased water absorption that makes the water management of the end product difficult.

We have observed that replacing 5-35 weight-% (of the dry matter of the slurry) of the legume protein fraction with oat protein fraction when having 10-45 weight-% (of the dry matter of the slurry) oat bran, wholegrain oat flour, or a mixture thereof, in textured food products, the water absorption decreases, sliminess is in control and the targeted fibrous texturization is surprisingly not transferred towards dough-like textures.

TABLE 1

|  | Legume protein | Oat protein |
| --- | --- | --- |
| Pea + OB20% | 64% | 4.6%* |
| Pead + OB30% | 56% | 6.9%* |
| Pea + OB30% + OP10% | 58% | 12.5%** |
| Pea + OB30% + OP20% | 40% | 18.9%** |

*Oat protein from oat bran only, when it is less available due to the cell wall structure and the carbohydrates covering it
**6.9% of the protein is from oat bran and rest is from oat protein fraction.

Figure 2:
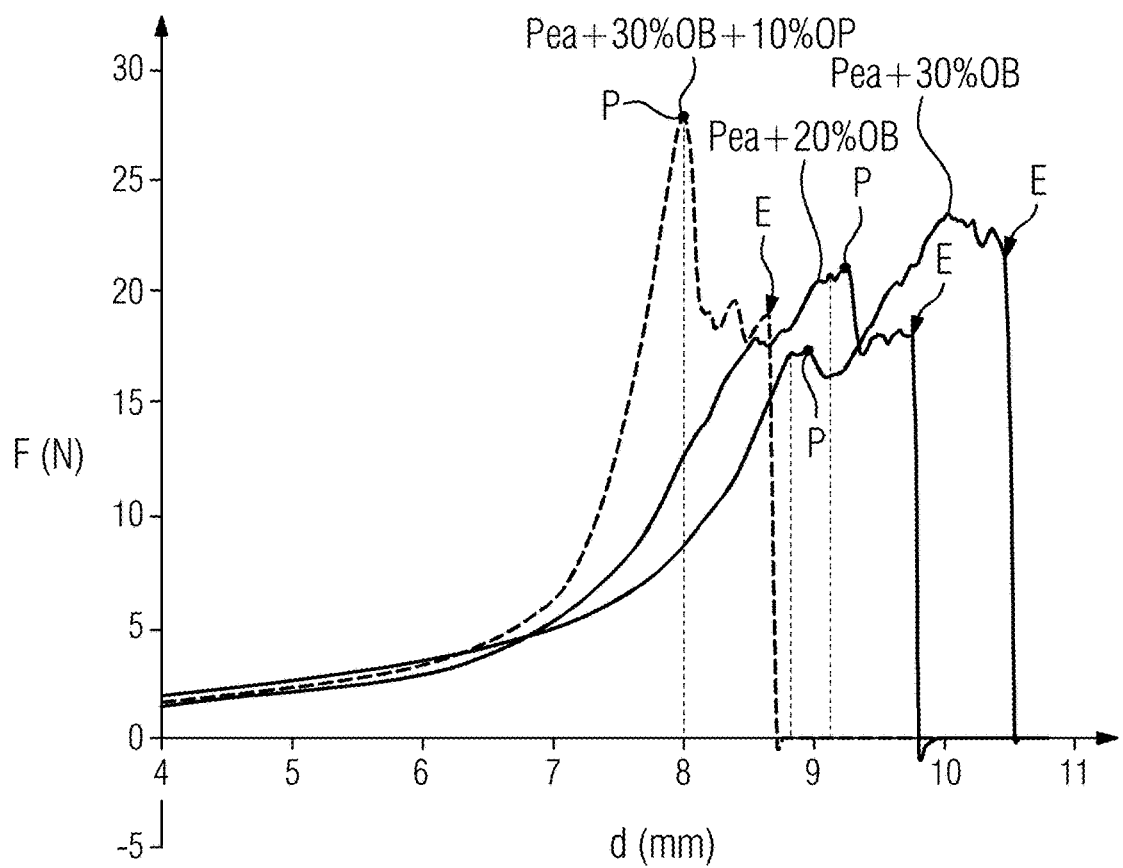
FIG. 2 is a diagram displaying measurement results of measurement of resistance force vs. displacement during a compression test, for three samples.

Table 1 shows oat and legume protein concentrations from dry matter of products that are used in FIGS. 1 and 2.

FIG. 1 shows water absorption rates and hydration levels of extruded texturized food product which contains legume protein (especially pea), 20% or 30% of oat bran (OB) and 10% of oat protein (OP); Water absorption and water hydration level are used to determine the amount of water absorbed by food product. As we can see from FIG. 1, when 30% of oat bran is used in the extruded texturized food product the water absorption rate reaches a level of more than 80% of water in less than 30 minutes. Also in the extruded texturized food product containing 20% of the oat bran, the water absorption rate reaches a level of more than 80% of water within 2 hours. However, the addition of 10% of oat protein in the extruded texturized food product containing 30% of oat bran decreased water absorption and hydration level surprisingly as water absorption rate stays in under 70% water level. The effect of reduced water absorption and hydration level of oat protein containing product is clearly shown in FIG. 1.

FIG. 2 shows the results of a measurement performed on three texturized food product samples with a CT3 Texture Analyzer of Brookfield Engineering Laboratories, Inc. The CT3 Texture Analyzer was equipped with an industrial blade having thickness of 0.23 mm. The first sample contained pea protein (Pea) and 30% of oat bran (OB), the second sample contained pea protein and 20% of oat bran, and the third sample contained pea protein, 30% of oat bran and 10% of oat protein.

In the measurement, we measured the resistance forces of the samples during a compression test with a knife blade. The measurements were carried out so that the CT3 Texture Analyzer was equipped with a 294.2 N (30 kg) load cell (detector sensor) and a sharp knife blade. The height of the samples were between 9.0 and 10.5 mm. The samples were stabilized and put horizontally on a plate and the direction of the sample was adjusted to let the blade compress (i.e. cut) towards the cross-section direction of the elongated fiber (in the length direction of the fiber). The downward speed before the blade touching the fiber was 1.5 mm/s (pre-test speed). The speed of compression when the blade touched the fiber was 1.0 mm/second (test speed) and compression went to a cutting depth until 99% of the height of the sample was reached. The resistance force N of all the samples increased after the blade touched the surface of the fiber. The increase of forces N was slow between 4-7 mm penetration distances of all the samples. After 7 mm penetration distance d, the force N increased at fastest in the third sample. The third sample also broke down faster than the other samples.

When the blade reached the penetration distance of 7.5-8.5 mm with a force of 16-28 N, the third sample reached the main peak P which is a sharp main peak, and the product was cut. The other samples the penetration distance d was over 8.5 mm for both before the main peak P was reached. For the first and the second samples, the main peak was not sharp but showed multiple smaller peaks indicating a dough-like texturization.

E denotes the end point of each measurement. When the compression reached 99% strain, the loading (compression) was ended and drawn back so that the resistance force drops to 0.

The resistance force N and penetration distances correspond with bite resistance that is required to break down the structure of the textured food product and are extremely important acceptability/quality parameter of texturized food product, and there is a window of texture associated by consumers with various protein-based products. For example, the rate at which the product breaks down on chewing, the number of chews required before the material can be swallowed, the textures exposed to the teeth and tongue during chewing are all important in determining the acceptability of the product, especially in the case of present invention where the texturized food product is used as ready-to-eat product that can be consumed as a snack or as heat- and boiling resistant cookable main course food. The fibrous structure of the texturized food product provides very acceptable mouthfeel, desirable chewiness and juiciness, and a feeling of real food when consumed as a snack or cookable main course food.

Penetration distance (mm) needed to break down the textured structure significantly decreased while adding oat protein in the structure.

Figure 3:
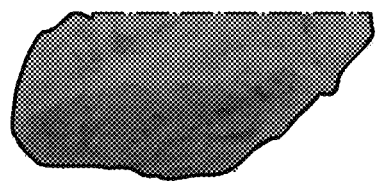
FIG. 3 is a photograph showing the structure of an extruded texturized food product, the dry mass of which contains 60% of certain legume proteins, 30% of oat bran and 10% of oat protein. The water content of the sample is ca. 20%.

FIG. 3 is a photograph showing the structure of sample 3. As we can see from FIG. 3, the structure is solid and does not contain significant or highly visible pores or air bubbles.

Figure 4:
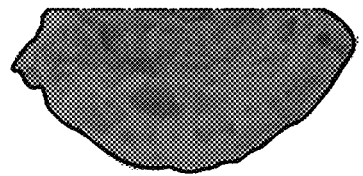
FIG. 4 is a photograph showing the structure of an extruded texturized food product, the dry mass of which contains 70% of certain legume proteins and 30% of oat bran.

FIG. 4 is a photograph showing the structure of sample 1. As we can see from FIG. 4, the structure is porous; this results from oat bran in the slurry. The feature is well known and commercially utilized, and is created by starch that oat bran contains. The feature is often desired to layer the product and modify the mouthfeel, and starch is used in several commercial soy texturates in level of 5%. Oat bran contains 50% of starch, which explains the phenomenon well.

When starch is added in relatively high levels as in the present method, and especially with other interfering components such as fiber (~14% in oat bran) and oil bodies (~8% in oat bran), the desired fibrous texture and bite resistance is ruined (cf. the description of the measurement the results of which are shown in FIG. 2 and discussed above).

This is in line with the measurements the results of which are shown in FIG. 2. For our sample 3, the porous texture is more moderate and the bite resistance much higher than for sample 1. Without wishing to be bound by any theory, it is thought that this may be due to the hydrophobic nature of the oat proteins opposite to the legume proteins that are excellent emulsifiers and foaming agents. The oat proteins break the bubble texture caused by starch rapid gelatination in the cooling stage, reduce the level of gelatination, water evaporation induces mass expansion and the escape of oats' soluble fibers, which both can create the unwanted slimy surfaces into the texture. When the gas bubbles are not interfering the protein-protein linkages, the texture is less porous, force required to break texturized food product increases and water absorption rates and hydration levels are reduced.

Figure 5:
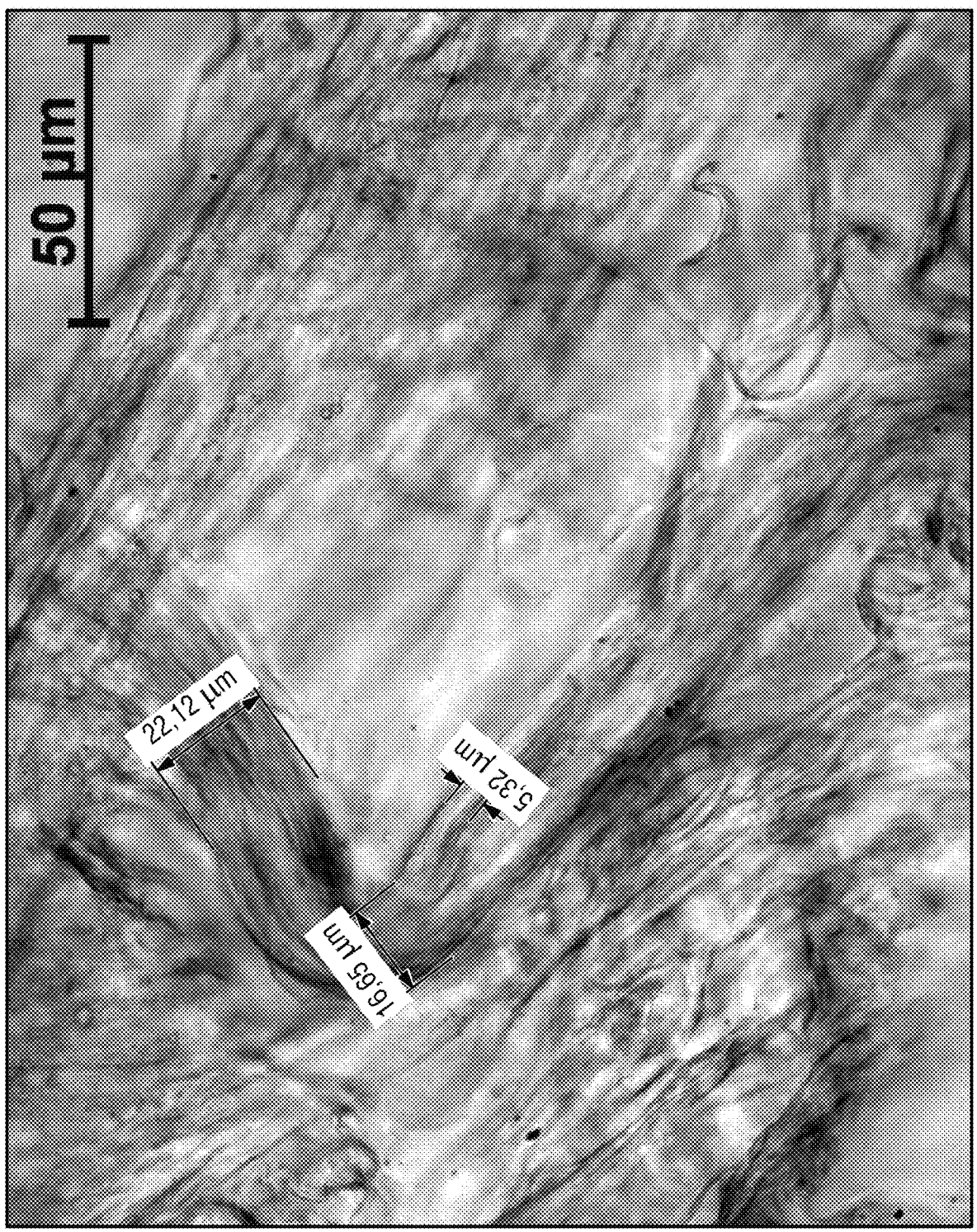
FIG. 5 shows the fibrous structure of an extruded texturized food product which contains pea protein and 20% of oat bran, captured by an electron microscope.

FIG. 5 shows the microscopic structure of an extruded texturized food product of the second sample as captured by an electron microscope. The fibrous structure consists of thick (between 20 and 30 μm) fibers that are bunched together and oriented multi-directionally. The fibrous texture is soft, slimy and gives a dough-like mouthfeel.

Figure 6:
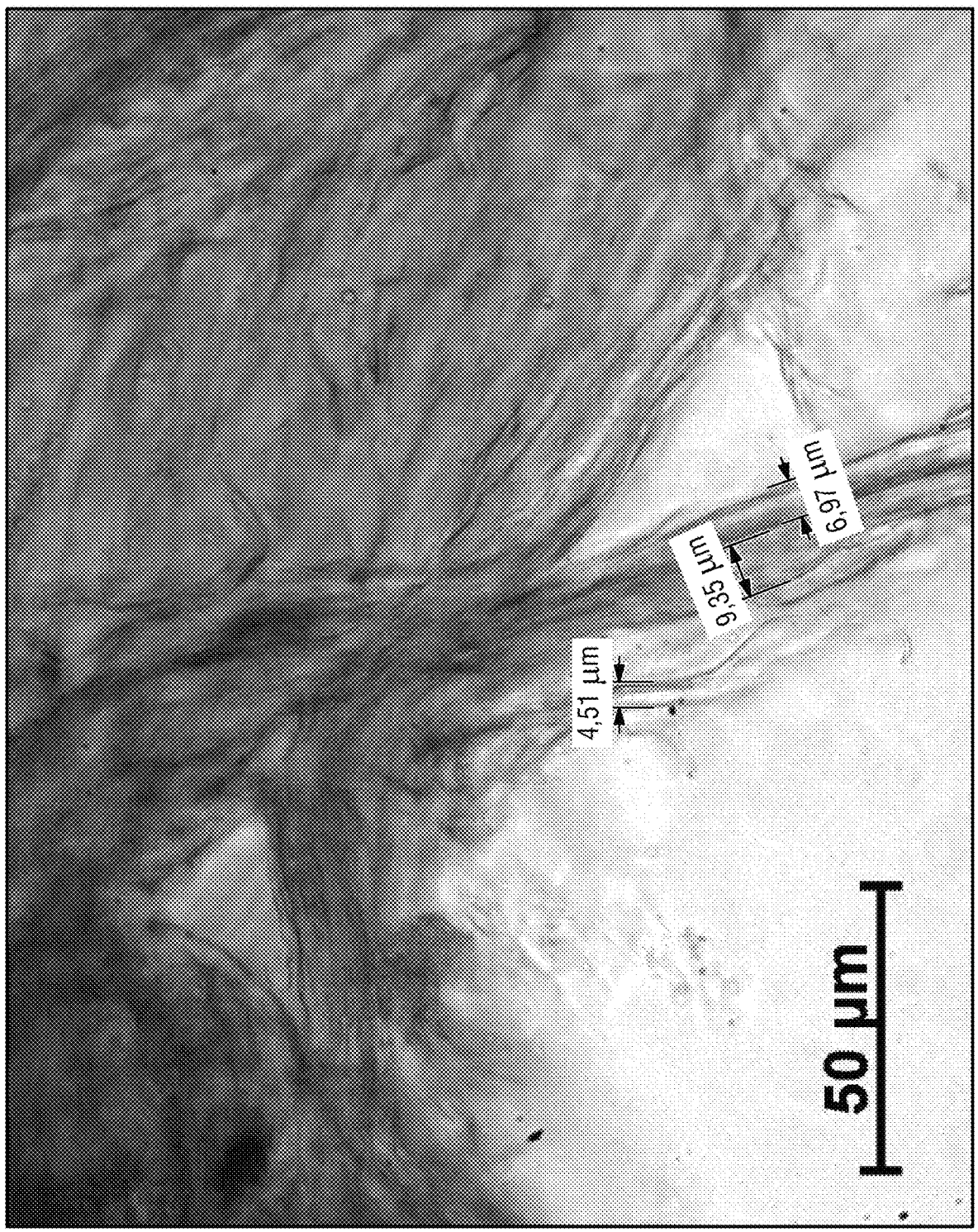
FIG. 6 shows the fibrous structure of extruded texturized food product which contains pea protein, 20% of oat bran and 10% of oat protein, captured by an electron microscope.

FIG. 6 shows the microscopic fibrous structure of a fourth sample that was a extruded texturized food product which contains pea protein, 20% of oat bran and 10% of oat protein, as captured by an electron microscope. The fibrous structure consists of relatively thick (between 15 and 20 μm) fibers that co-aligned and bunched together. The structure is comparable with meat and gives a pleasant and soft meat-like mouthfeel.

Figure 7:
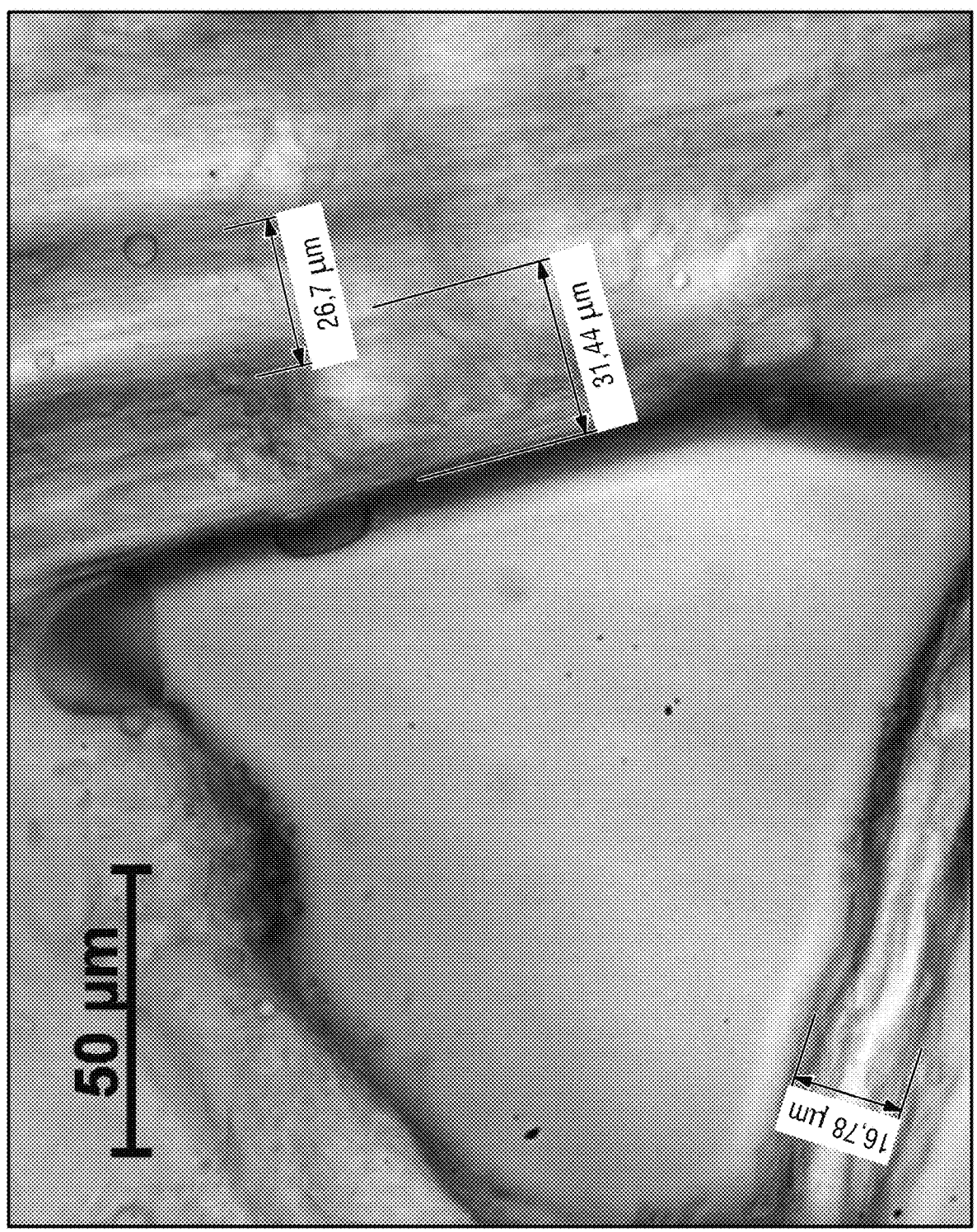
FIG. 7 shows the fibrous structure of extruded texturized food product which contains only pea protein, captured by an electron microscope.

FIG. 7 shows the microscopic structure of a fifth sample that was an extruded texturized food product containing pea protein only, as captured by an electron microscope. The structure consist of very long, hair-like, branched and very fine continuous bunches of fibers. We have observed that this kind of structure is not easy to swallow and gives a hairy mouthfeel.

Figure 8:
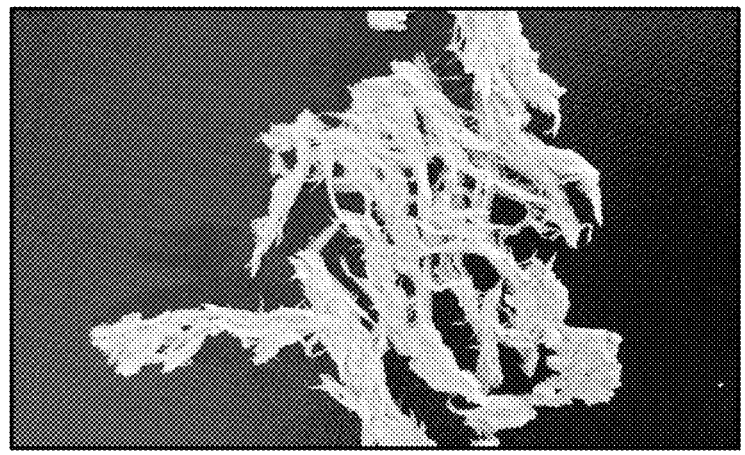
FIG. 8 shows the fibrous structure of extruded texturized food product which contains pea protein, 20% oat bran and 10% of oat protein, captured by a microscope.

FIG. 8 shows the fibrous structure of a sixth sample that was an extruded hydrated texturized food product containing pea protein, 20% oat bran and 10% of oat protein, captured by a microscope. The fibers in the sixth sample are 10 times thicker than in a seventh sample that was an extruded texturized food product which contains only legume protein.

Figure 9:
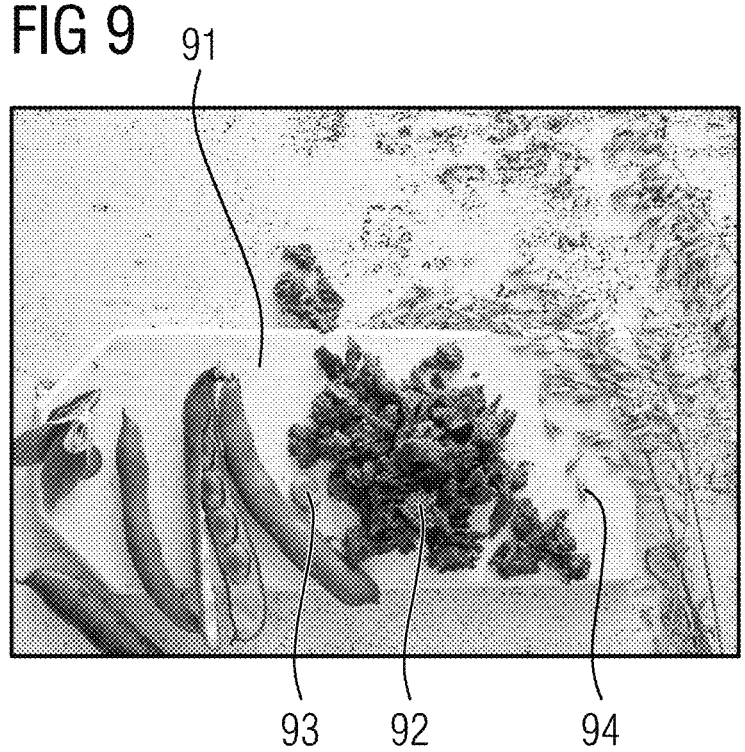
FIG. 9 shows a serving of consumer-ready texturized food product which contains legume protein (especially pea), oat bran and oat protein, placed on a cutting board.

FIG. 9 is a photograph showing a serving of consumer-ready texturized food product 92 which contains legume protein (especially pea), oat bran and oat protein, placed on a cutting board 91. A Vicia faba pods and seeds 93 and a dried oat plant 94 are also shown to illustrate the dimensions.

The soft but fibrous structure of the texturized food product 92 gives a very acceptable mouthfeel, a desirable chewiness and juiciness, and a feeling of real food when consumed as a snack or as a cooked main course food.

With regard to the sliminess of the second sample, we made a viscosity analysis on the second sample and a seventh sample (the dry matter of the slurry contained pea protein, 20 weight-% of oat bran and 20 weight-% of oat protein) with a Thermohaake® Rheostress® 600 (both trade marks of Thermo Electron GmbH, Dreieich, Germany) measurement apparatus. A flow curve obtained by using the cone and plate geometry (60 mm, 1° over a shear rate range of 0.3-300 l/s at 21° C.) showed a significant difference between sample 2 and sample 3. The apparent viscosity at 10 l/s was 10-20 mPas for the seventh sample and 100-130 for the second sample. The replacement of a part of the pea protein with oat protein results in a significant decrease in the viscosity. This is an indicator that the felt sliminess reduces as well.

The legume proteins used in the method may comprise any proteins delivered from legumes. A legume is a plant in the family Fabaceae (or Leguminosae), or the fruit or seed of such a plant. Well-known legumes include alfalfa, clover, peas, beans, Vicia fabas, lentils, lupins, mesquite, carob, soybeans, peanuts and tamarind. We have carried out our tests with pea based legume proteins, peanut based legume proteins, Vicia faba based legume proteins, and with a combination of these. However, we suppose that any of the other mentioned proteins could be used to produce the texturized food product of this invention and in the method accordingly.

Not only the structure of the texturized food product manufactured by the present method considerably differs from porridges, biscuits, breads, morning cereals, flapjack bars, granolas, noodles, oat rice and mueslis, where oat has previously been used, but also the nutritional values are different.

Oat contains 12-23 weight-% of protein that is a protein content comparable with *quinoa* or other plants having a reputation as good protein sources. The amino acid content is better than in any other grain, thus the lysine content is also high among grains. In addition, oat contains high levels—even more than egg or other animal proteins—of sulfuric acid (mainly cystine) per protein, which is especially related to the good bone healthy. The lysine content that limits the use of grain proteins in textured food products is also relatively high in oats. However, it is still low when compared to the legumes and thus high lysine containing protein from legumes may be desired to balance off the relatively low concentration of lysine in the oat protein.

The textured food product according to the present invention will be a source of all essential amino acids isoleucine, leucine, lysine, methionine, phenylalanine, threonine, tryptophan, valine and histidine.

TABLE 2

|  | Sample | *Quinoa* | Egg | Beef | Soy | WHO |
| --- | --- | --- | --- | --- | --- | --- |
| Icoleucine | 1239 | 480 | 750 | 1000 | 800 | 1400 |
| Leucine | 2324 | 840 | 1100 | 1700 | 1400 | 2730 |
| Lycine | 1673 | 700 | 900 | 1800 | 1150 | 2100 |
| Methionine | 426 | 310 | 440 | 560 | 225 | 1050 |
| Cystine | 425 | 150 | 260 | 150 | 240 |  |
| Phenylalanine | 1532 | 500 | 710 | 870 | 900 | 1750 |
| Tyrosine | 3486 | 410 | 560 | 730 | 550 |  |
| Threonine | 1600 | 370 | 600 | 940 | 700 | 1050 |
| Tryptophan | 401 | 1100 | 180 | 230 | 230 | 280 |

TABLE 2-continued

| | Sample | Quinoa | Egg | Beef | Soy | WHO |
|---|---|---|---|---|---|---|
| Valine | 2279 | 570 | 950 | 1100 | 850 | 1820 |
| Arginine | 2483 | 1200 | 830 | 1300 | 1300 | |
| Histidine | 963 | 360 | 320 | 760 | 455 | 700 |
| Alanine | 1272 | 530 | 790 | 1300 | 750 | |
| Aspartic acid | 2880 | 1070 | 1400 | 1900 | 2100 | |
| Glutamic acid | 5142 | 1890 | 1500 | 3100 | 3350 | |
| Glycine | 1180 | 880 | 460 | 1100 | 750 | |
| Proline | 1352 | 560 | 500 | 870 | 1000 | |
| Serine | 1461 | 570 | 990 | 870 | 900 | |

Table 2 shows measured amino acid compositions of a texturized food product manufactured with the present method, as compared with literature [2] values for Quinoa, Egg (whole chicken egg), Beef (raw lean meat) and moistened textured soy. The amino acid content (in milligrams) taken from 100 g of each product. The values in column WHO represent the daily requirements for the essential amino acids (milligrams of amino acid that a person with a weight of 70 kg should consume daily). As can be seen, the texturized food product manufactured according to the method of the present invention (37% oats, 33% pea, 25% Vicia faba, oil and spices) has a relatively high amount of essential amino acids.

The soluble fiber content of the textured food products manufactured with the present method will be high: a quantified portion (80-120 g) will contain at least 1 g of beta-glucan. That amount enables the health claims about maintaining cholesterol levels, lowering blood cholesterol and thereof improving cardiac health [3] [4].

In addition to excellent amino acid and soluble fiber content, the textured food products of present invention contains oils (1-10%) that are delivered from oats. Oat contains a relatively high amount of lipids and best fatty acid composition among grains. It contains relatively high amounts of oil acid and essential linoleic acid.

In the present method, at least 10 weight % of oat protein is used to prepare the slurry. This share of oat protein is sufficient to attain reasonable sulfurous containing amino acids in a quantified portion (80-120 g), If only incorporating oat bran or oat flour to the texturized food product, the ratio of oat bran or oat flour should be a total of >55% of all ingredients to attain reasonable sulfurous containing amino acids to the food product in quantified portion (80-120 g). This would dilute the lysine content of the product and also result in unsuitable dough-like structure.

One of the challenges with soya based textured products widely utilized as a plant based main course is the beany taste of the products that makes consumer to search alternatives. Oat, utilized in the present invention, serves a mild taste and highly ecological alternative. According to our studies, the mild, grainy taste of oats effectively hinders the beany taste of legumes (especially Vicia faba and/or pea). The replacement of 10% of the legume protein concentrate with oat protein concentrate is significant. The beany taste disappears or is very mild in the product containing 40% of oat materials and 60% of pea protein concentrate. Also the "oaty" taste of the product is very mild or has completely disappeared.

Method of Manufacturing the Extruded Textured Legume Protein Containing Food Product Comprising Oat Bran and Oat Protein The method of manufacturing the textured food product comprising at least one legume protein, oat bran and oat protein can be illustrated by the following examples, although it will be understood that these examples are included merely for purposes of illustration and are not intended to limit the scope of the invention.

Example 1

Manufacturing of Extruded Textured Legume Protein, Oat Bran and Oat Protein Containing Ready-to-Eat Product that can be Consumed as a Snack with 50% of Oats Fine flours (the average particle size 320 μm) of oat bran 20%, oat protein fraction 20%, whole oat flour 10%, Vicia faba protein concentrate 25% and pea protein isolate 25% are mixed with water to result in 30% water content. The mix is fed to a 40 kg capacity twin-screw extruder with a speed of 25 kg/h. Screw speed of 300 rpm is settled and temperatures profile 60° C.→175° C.→130° C. used in six temperature sections. The mass is let shortly to cool in 10 cm long die. From extrusion, the cut fibrous pieces are moistened and spiced in a drum by spraying spiced water. The moisture is adjusted to 40%, rapeseed or other high quality oil is sprayed and salt sprinkled on top, followed by heating the pieces in oven for 15 minutes (180° C.) to attain color and crispy surface with chewable core.

Example 2

Manufacturing of Extruded Textured Legume Protein, Oat Bran and Oat Protein Containing Main Course Product Fine flours (the average particle size 320 μm) of oat bran 20%, oat protein fraction 20%, Vicia faba protein concentrate 30% and pea protein isolate 30% are mixed with water to result in 30% water content. The mix is fed to a 40 kg capacity twin-screw extruder with speed of 25 kg/hour. Screw speed of 300 rpm is settled and temperatures profile 60° C.→175° C.→130° C. used in six temperature sections. The mass is let shortly to cool through 10 cm long die.

The cut fibrous pieces are moistened with mixing up to 54% moisture with water, salt and spices. The moistened fibers are mixed with high speed mixer to organic shape pieces, pea and oat protein are added in a concentration of 6% to the mass. Rapeseed oil and hydrophobic spices are added during mixing 15 minutes. After mixing, the pieces are optionally heated under steam and pressure (1 bar) at 120° C. for 15 minutes. Dry spices are added, and the products are packed under 80% of $CO_2$ and 20% of $N_2$. The consumer heats the product in a pan with oil or in oven.

Example 3

Manufacturing of Extruded Textured Legume Protein, Oat Bran and Oat Protein Containing Product with Further Post Extrusion Treatment Fine flours (the average particle size 320 μm) of oat bran 20%, oat protein fraction 20%, Vicia faba protein concentrate 30% and pea protein isolate 30% are mixed with water to result in 30% water content. The mix is fed to a 40 kg capacity twin-screw extruder with speed of 25 kg/hour. Screw speed of 300 rpm is settled and temperatures profile 60° C.→175° C.→130° C. used in six temperature sections. The mass is let shortly to cool through 10 cm long die.

After extrusion treatment the post extrusion treatment is carried out by moisturizing the texturized food product with spiced water where the share of water to the dry material is between 1:1.0 to 1:1.5 and brewed whereby the texturized food product is placed in a liquid and fermented or, alternatively, the food product is hydrated, wetted or soaked for between 2-14 hours before further processing. The brewed (or alternatively, hydrated, wetted or soaked) texturized food product is further treated with amylase and processed with high speed mixing for 1-60 minutes. After that an additional high pressure cooking step is performed in an autoclave or in a pressurized cooking device, preferably having a pressure of at least 1.9 bar, and preferably for 20 to 60 minutes (even more preferably, for around 25 minutes or for between 30 to 60 minutes, such as for 35 to 45 minutes). Instead of the high pressure cooking step, the treated food product may be baked or cooked in a baking or cooking step, preferably in an oven or in a steam oven, at a temperature of between 110 and 130° C., most preferably around 121° C.

Surprisingly, this post extrusion treatment further improves pleasant sensory properties of the texturized food products. Although the examples above show the use of twin-screw extruder, it should be understood that extrusion processes are very diverse and manufacturing of extruded textured legume protein, oat bran and oat protein containing product can be prepared via use of any acceptable model of type food processing extruder, both with single screw or with twin screw types.

It is obvious to the skilled person that, along with the technical progress, the basic idea of the invention can be implemented in many ways. The invention and its embodiments are thus not limited to the examples described above but they may vary within the contents of patent claims and their legal equivalents.

REFERENCES

[1] Harper, J. M. 1979. Extruder not prerequisite for texture formation. J Food Sci 44: ii.
[2] Danish Food Composition Databank—ed. 7.01 (http://www.foodcomp.dk/v7/fcdb_search.asp)
[3] EFSA Journal 2011; 9(6):2207
[4] EFSA Journal 2010; 8(12):1885

LIST OF REFERENCE NUMERALS USED 91 cutting board
92 serving of textured food product
93 *Vicia faba* seed
94 dried oat plant

The invention claimed is:

1. A method of manufacturing a meat substitute food product, comprising the steps of:
    preparing a slurry comprising dry matter and water,
    i) wherein the dry matter comprises:
        1. at least 35% by weight of the dry matter of a legume protein,
        2. 10% to 45% by weight of the dry matter of an oat product selected from the group of oat products consisting of oat bran, wholegrain oat flour and a mixture of oat bran and wholegrain oat flour, and
        3. 5% to 35% by weight of the dry matter of a non-hydrolysed oat protein isolate or concentrate,
    wherein a combination of said oat product and said non-hydrolysed oat protein isolate or concentrate comprises no more than 65% by weight of the dry matter; and
    ii) wherein the slurry comprises water between 20%-80% by weight of the dry matter;
    cooking the slurry in an extruder cooker; and
    extruding the cooked slurry to form said meat substitute food product.

2. The method according to claim 1, wherein the step of cooking is performed at a temperature of between 130° to 180° C.

3. The method according to claim 1, wherein the combination of said oat product and said non-hydrolysed oat protein isolate or concentrate comprises between 40% to 60% by weight of the dry matter weight of the slurry and wherein said dry matter weight of said combination of said oat product and said non-hydrolysed oat protein isolate or concentrate is selected to produce a meat substitute food product having a consistency for which a resistance force exhibited by a 9.0 to 10.5 mm high sample of said meat substitute food product during a compression test with a knife blade required to cut the sample meat substitute food product is between 16 N and 28 N with a penetration distance between 5.5 and 8.5 mm.

4. The method according to claim 1, wherein after the step of extruding the cooked slurry to form said meat substitute food product, the extruded meat substitute food product is further processed with water, salt, oil and spices and processed by a process selected from the group of processes consisting of brewing, hydrating, wetting and soaking for between 2-12 hours before performing an additional process step on said further processed meat substitute food product selected from the group of additional process steps consisting of baking, cooking and high pressure cooking.

5. The method according to claim 4, wherein during the brewing, hydrating, wetting or soaking step, the ratio of water to the meat substitute food product is between 1:1.0 to 1:1.5 by weight.

6. The method according to claim 4, wherein amylase is added to the meat substitute food product after the extruder cooking step but before the additional high pressure cooking step.

7. The method according to claim 4, wherein the additional high pressure cooking step is performed in one of an autoclave or a pressurized cooking device at a pressure of at least 1.9 bar for between 20 to 60 minutes.

8. The method according to claim 1, wherein the legume protein introduced into the slurry is selected from the group of legume proteins consisting of: pea protein concentrate, pea protein isolate, *Vicia faba* protein concentrate, *Vicia faba* protein isolate, peanut protein concentrate and peanut protein isolate.

9. The method according to claim 1, wherein the step of extruding is carried out as a protein texturization extrusion process.

10. The method according to claim 9, wherein a water feed rate during the step of extruding and other extruding step parameters are selected such that the meat substitute food product will result in co-aligned fibers that are bunched together and have a thickness of between 15 and 20 μm.

11. The method according to claim 1, wherein the percentage of non-hydrolysed oat protein isolate or concentrate is chosen to produce a meat substitute-food product having an apparent viscosity less than 20 mPa·s at a shear rate of 10 l/s.

12. A meat substitute food product manufactured according to the method of claim 1.

13. The method according to claim 1, wherein said water in said slurry comprises between 30% and 40% by weight of the dry matter.

14. The method according to claim 1, wherein said water in said slurry comprises between 35% and 40% by weight of the dry matter.

15. The method according to claim 1, wherein the step of cooking is performed at a temperature in the range of between 170° to 180° C.

16. The method according to claim 1, wherein the step of cooking is performed at a temperature of 175° C.

17. The method according to claim 3, wherein, said penetration distance is between 7.5 and 8.5 mm.

18. The method of claim 4, wherein said water, oil and spices are sprayed at the meat substitute food product and said salt is sprinkled on said textured food product.

19. The method of claim 1, wherein the legume protein is a legume protein isolate or concentrate.

20. The method according to claim 4, wherein the additional baking or cooking step is performed in an oven or steam oven, at a temperature between 110 and 130° C.

21. The method according to claim 7, wherein the additional high pressure cooking step is performed at a pressure of between 1.9 and 2.1 bar.

22. The method according to claim 20, wherein the additional baking or cooking step is performed in an oven or steam oven, at a temperature of 121° C.

23. The method according to claim 11, wherein the percentage of said non-hydrolysed oat protein isolate or concentrate is chosen to produce a meat substitute food product having an apparent viscosity between 10 and 20 mPa·s at a shear rate of 10 l/s.

24. The method according to claim 1, wherein the percentage of said non-hydrolysed oat protein isolate or concentrate is chosen to produce a meat substitute food product having water absorption rate of less than 70% water level in 120 minutes.

25. A method of manufacturing a meat substitute food product, comprising the steps of:
preparing a slurry comprising dry matter and water,
i) wherein the dry matter comprises:
　1. at least 35% by weight of the dry matter of a legume protein,
　2. 10% to 45% by weight of the dry matter of an oat product selected from the group of oat products consisting of oat bran, wholegrain oat flour and a mixture of oat bran and wholegrain oat flour, and
　3. 5% to 35% by weight of the dry matter of a non-hydrolysed oat protein isolate or concentrate,
　　wherein a combination of said oat product and said non-hydrolysed oat protein isolate or concentrate comprises no more than 65% by weight of the dry matter, wherein the percentage of said non-hydrolysed oat protein isolate or concentrate is chosen to produce a meat substitute food product having an apparent viscosity between 10 and 100 m as at a shear rate of 10 l/s; and
ii) wherein the slurry comprises water between 20%-80% by weight of the dry matter;
cooking the slurry in an extruder cooker; and
extruding the cooked slurry to form said meat substitute food product.

26. A method of manufacturing a meat substitute food product, comprising the steps of:
preparing a slurry comprising dry matter and water,
i) wherein the dry matter comprises:
　1. at least 35% by weight of the dry matter of a legume protein fraction,
　2. 10% to 45% by weight of the dry matter of an oat product selected from the group of oat products consisting of oat bran, wholegrain oat flour and a mixture of oat bran and wholegrain oat flour, and
　3. 5% to 35% by weight of the dry matter of a non-hydrolysed oat protein isolate or concentrate,
　　wherein a combination of said oat product and said non-hydrolysed oat protein isolate or concentrate comprises no more than 65% by weight of the dry matter, and wherein the percentage of said non-hydrolysed oat protein isolate or concentrate is chosen to produce a meat substitute food product having water absorption rate of less than 80% water level in 120 minutes; and
ii) wherein the slurry comprises water between 20%-80% by weight of the dry matter;
cooking the slurry in an extruder cooker; and
extruding the cooked slurry to form said meat substitute food product.

* * * * *